(12) United States Patent
Rajendran et al.

(10) Patent No.: US 7,347,049 B2
(45) Date of Patent: Mar. 25, 2008

(54) METHOD AND SYSTEM FOR THERMOCHEMICAL HEAT ENERGY STORAGE AND RECOVERY

(75) Inventors: Veera Palanivelu Rajendran, Niskayuna, NY (US); Chellappa Balan, Niskayuna, NY (US); Charles Max Byrd, North Greenbush, NY (US); Bahram Keramati, Schenectady, NY (US); Todd Garrett Wetzel, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 498 days.

(21) Appl. No.: 10/968,606

(22) Filed: Oct. 19, 2004

(65) Prior Publication Data
US 2006/0080960 A1 Apr. 20, 2006

(51) Int. Cl.
*F01K 25/06* (2006.01)
(52) U.S. Cl. ............................ 60/649; 60/673; 60/676
(58) Field of Classification Search .................. 60/649, 60/673, 676
See application file for complete search history.

(56) References Cited

U.S. PATENT DOCUMENTS

| | | | |
|---|---|---|---|
| 4,122,680 A * | 10/1978 | Isshiki et al. ................. | 60/649 |
| 4,319,626 A | 3/1982 | Papazian et al. | |
| 4,327,553 A | 5/1982 | Rilett | |
| 4,481,775 A | 11/1984 | Beveridge | |
| 4,573,321 A * | 3/1986 | Knaebel ...................... | 60/649 |
| 4,822,391 A | 4/1989 | Rockenfeller | |
| 4,848,994 A | 7/1989 | Rockenfeller | |
| 4,875,915 A | 10/1989 | Rockenfeller | |
| RE34,259 E | 5/1993 | Rockenfeller | |
| 5,613,362 A | 3/1997 | Dixon | |
| 5,806,316 A | 9/1998 | Avakov et al. | |
| 6,141,966 A * | 11/2000 | Osumi ......................... | 60/673 |
| 6,158,237 A | 12/2000 | Riffat et al. | |
| 6,244,056 B1 | 6/2001 | Pfister et al. | |

(Continued)

FOREIGN PATENT DOCUMENTS

DE  929066  6/1955

(Continued)

OTHER PUBLICATIONS

"Thermal Studies and Oxidation Reactions with Room-Temperature Ionic Liquids", Dalice M. Pinero Cruz, Doe Erulf Program, University of Puerto Rico, National Renewable Energy Laboratory, Golden, Colorado, Aug. 4, 2000, pp. 1-14.

(Continued)

*Primary Examiner*—Hoang Nguyen
(74) *Attorney, Agent, or Firm*—Paul J. DiConza; William E. Powell, III

(57) ABSTRACT

Disclosed herein is a system for generating energy, comprising a first heat exchanger in communication with a first heat source; wherein the first heat exchanger contacts a transfer fluid that comprises a working fluid and an associating composition; and a first energy conversion device comprising a moving surface, wherein the first heat exchanger is in communication with the moveable surface of the first energy conversion device; and wherein a dissociation of the transfer fluid in the first heat exchanger generates a vapor of the working fluid that contacts the moving surface of the first energy conversion device.

29 Claims, 8 Drawing Sheets

U.S. PATENT DOCUMENTS

| | | | |
|---|---|---|---|
| 6,269,644 B1 | 8/2001 | Erickson et al. | |
| 6,430,943 B2 | 8/2002 | Pfister et al. | |
| 6,501,091 B1 | 12/2002 | Bawendi et al. | |
| 6,829,895 B2 * | 12/2004 | Kalina | 60/649 |
| 6,910,334 B2 * | 6/2005 | Kalina | 60/651 |
| 6,962,054 B1 * | 11/2005 | Linney et al. | 60/649 |

FOREIGN PATENT DOCUMENTS

| | | |
|---|---|---|
| JP | 59058104 | 4/1984 |
| JP | 59058105 | 4/1984 |

OTHER PUBLICATIONS

"Novel Ionic Liquid Thermal Storage for Solar Thermal Electric Power Systems" Banqiu Wu et al., Proceedings of Solar Forum 2001, Solar Energy: The Power to Choose, Apr. 21-26, 2001, Washington, D.C., 7 pages.

European Search Report—Mar. 31, 2006.

Translation of DE929066.

* cited by examiner

METHOD AND SYSTEM FOR THERMOCHEMICAL HEAT ENERGY STORAGE AND RECOVERY

BACKGROUND

This disclosure relates to methods and systems for thermochemical heat energy storage and recovery.

Most of the world's energy requirements are currently met by nuclear power plants and fossil-based power plants. In recent years, gas fired combined cycle plants have become popular due to lower capital costs and lower emissions. While these power plants currently meet the world's energy needs, they are, however, the subjects of a strenuous environmental debate. Carbon dioxide emissions from gas and fossil-based power plants are speculated to be sources of global warming. There is currently pending, or in-place legislation in various countries that is aimed at restricting their use. The rapid consumption of gas and fossil-fuel reserves from the earth has led to numerous questions about the long-term sustainability of such resources. It is therefore desirable to develop sources of energy that are environmentally friendly and which are easily available.

Significant amounts of energy are regularly lost in power plants such as chemical or nuclear reactors, as well as in internal combustion engines and the vehicles driven by these engines. For example, modern heavy freight-haul locomotives contain diesel engines with gross power ratings of about 4,500 to about 6,200-horse power (hp) and up to six powered axles to pull trains weighing about 12,000,000 pounds per locomotive. These locomotives have dynamic brake resistors that are capable of dissipating in excess of 7,000 horse power (hp) (5.2 mega-Watts (MW)), while maintaining speed on downhill grades and while decelerating the train. Similar energy dissipation occurs during self-load testing of the diesel engine, alternator, and associated power-train components. This dissipated energy is generally not recovered.

In addition, in a diesel locomotive, a large portion of the fuel energy is wasted in the form of exhaust. Approximately 30% of the total energy from the fuel is lost as waste heat in the engine's exhaust and approximately 30% of the total fuel energy is lost into engine's cooling system. Fuel efficiency is therefore desirable in the railroad industry. Recent emissions regulations require a reduction of combustion temperatures and hence lower intake manifold air temperatures for the engine cylinders. Increased auxiliary power is required to operate the fans and engine coolant water pumps to meet the new emissions requirements. Locomotive fuel economy is reduced when the engine is modified to achieve these emission levels. It is therefore desirable to recapture some of the energy lost in the exhaust of the engine as well as the energy that is lost when braking occurs.

SUMMARY

Disclosed herein is a system for generating energy, comprising a first heat exchanger in communication with a first heat source; wherein the first heat exchanger contacts a transfer fluid that comprises a working fluid and an associating composition; and a first energy conversion device comprising a moving surface, wherein the first heat exchanger is in communication with the moveable surface of the first energy conversion device; and wherein a dissociation of the transfer fluid in the first heat exchanger generates a vapor of the working fluid that contacts the moving surface of the first energy conversion device.

Disclosed herein too is a system for generating energy, comprising a first heat exchanger in thermal communication, fluid communication, or a combination of thermal and fluid communication with a first heat source, wherein the first heat exchanger heats a transfer fluid that comprises a working fluid and an associating composition, wherein the working fluid and the associating composition are capable of reversible associating with each other and wherein heating of the transfer fluid in the first heat exchanger generates a vapor comprising the working fluid; a first separator in thermal communication, fluid communication, or a combination of thermal and fluid communication with the first heat exchanger and downstream of the first heat exchanger; a first superheater in thermal communication, fluid communication, or a combination of thermal and fluid communication with the first separator and downstream of the first heat exchanger; a first energy conversion device in thermal communication, fluid communication, or a combination of thermal and fluid communication with the first superheater and downstream of first superheater, wherein the first energy conversion device comprises a moving surface that is contacted by the vapor generated in the first heat exchanger; an absorber downstream of the first energy conversion device and in thermal communication, fluid communication, or a combination of thermal and fluid communication with the energy conversion device, wherein the absorber is adapted to receive the vapor that has passed through the energy conversion device and to receive the associating composition that has passed through the heat exchanger; a first regenerator located upstream of the absorber and in thermal communication, fluid communication, or a combination of thermal and fluid communication with the absorber, wherein the regenerator is adapted to receive the transfer fluid from the absorber and allows the transfer fluid to return to the first heat exchanger; and a pump in thermal communication, fluid communication, or a combination of thermal and fluid communication with the first heat exchanger.

Disclosed herein is a method for the generation of energy comprising dissociating a transfer fluid that comprises a working fluid and an associating composition; producing a vapor of the working fluid; and contacting a moving surface of an energy conversion device with the vapor of the working fluid to convert thermal energy to electrical energy.

DETAILED DESCRIPTION OF FIGURES

Referring now to the figures, which are exemplary embodiments, and wherein the like elements are numbered alike:

DETAILED DESCRIPTION OF EMBODIMENTS

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Furthermore, in describing the arrangement of components in embodiments of the present disclosure, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it will be apparent to those skilled in the art that a device may be both "upstream" and "downstream" of the same device in certain configurations, e.g., a system comprising a recycle loop.

Disclosed herein are systems and methods for generating energy from sources of heat that are normally lost, such as, for example, the exhaust streams of engines, including internal combustion engines and turbine engines; vehicle braking systems, including those used on diesel engine locomotives; chemical and nuclear reactors; and any other application or device where a significant amount of energy is generally lost in the form of heat. Disclosed herein too are systems and methods for generating energy from heat sources, including such environmentally friendly sources as geothermal or solar heat energy sources. This conversion of lost energy from exhaust streams and the like, into useful energy improves the efficiency of the system. Such a modification reduces emissions and since a reduced amount of fuel is used to produce the same power, it makes the energy conversion environmentally friendly. This method for generating power is flexible and robust and the energy can be generated in either a batch system or a continuous system. Additionally, the wasted heat can be advantageously stored for a period of time and used during periods of low energy supply or during periods when the demand for energy (load) is high.

Figure 1:
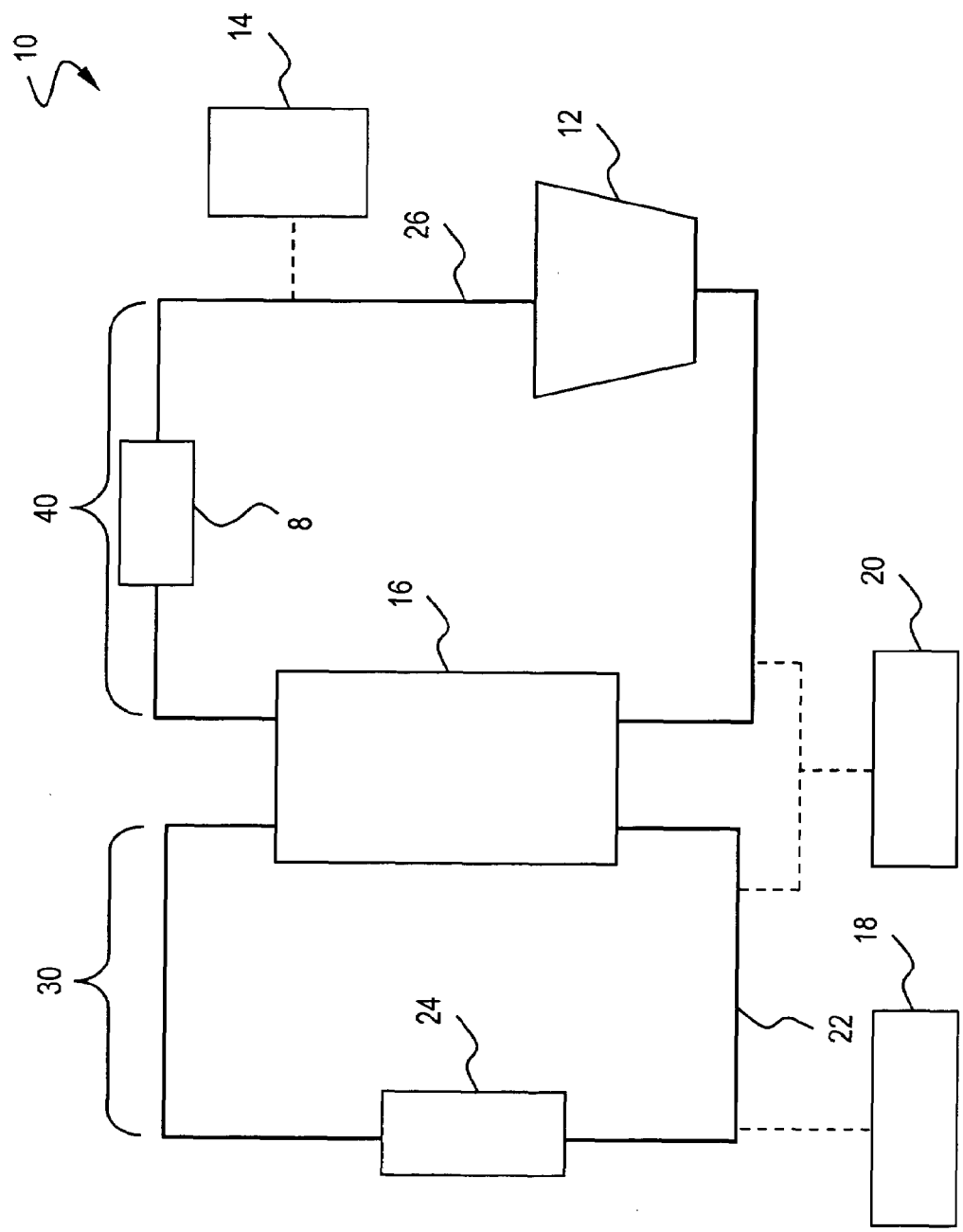
FIG. 1 is an exemplary depiction of one embodiment of a method for generating energy from heat extracted from another source.

With reference to FIG. 1, an exemplary embodiment of a system 10 for generating energy comprises an energy conversion device 12, a first absorber 8 and a first heat exchanger 16. The system 10 can also have optional components such as, for example, a cooling station 14, a make-up fluid reservoir 18, a central monitoring station 20. Other optional components can be included in the system 10 (not shown), depending upon the nature of the particular application for which the system 10 is being designed. Examples of such optional components include a superheater, a separator, an intercooler and a regenerator. The functions of the superheater, the separator, the intercooler and the regenerator are demonstrated in later figures and their respective functions will be explained in detail later in the disclosure. A first pipe 22 can be optionally used to transfer energy in the form of heat from a heat source 24.

In one embodiment, a first fluid in the first pipe 22 transfers heat from the heat source 24 to the first heat exchanger 16. The first pipe 22 can therefore form a heat supply system 30, which can be in the form of a closed loop and includes the heat source 24 and the first heat exchanger 16. Alternatively, the first pipe 22 can facilitate the supply of heat to the first heat exchanger 16, without the use of a closed loop 30. In this event, the first fluid in the first pipe 22 can be exhausted to the environment or to a waste stream after transferring its heat to the first heat exchanger 16.

The first heat exchanger 16 is generally located downstream of the heat source 24. The heat supply system 30 thus comprises the following elements—the heat source 24, the first heat exchanger 16, and the first pipe 22. The first heat exchanger 16 is also in fluid and/or thermal communication with a first absorber 8 and a first energy conversion device 12 via a second pipe 26 that forms a closed loop 40. The closed loop 40 thus comprises the following elements—the first heat exchanger 16, a first absorber 8, the first energy conversion device 12 and the second pipe 26. A transfer fluid contacts the first heat exchanger 16, the first absorber 8 and the first energy conversion device 12 via the second pipe 26. In the closed loop 40, the first energy conversion device 12 is located down stream of the first heat exchanger 16 and is in fluid and/or thermal communication with the first heat exchanger 16. The first absorber 8 is located downstream of the energy conversion device 12 and is in thermal and/or fluid communication with it. The first absorber 8 can also incorporate a cooling station if desired. The heat supply system 30 and the closed loop 40 are in thermal and/or fluid communication with one another via the first heat exchanger 16. Optional elements present in the heat supply system 30 and the closed loop 40 are valves, nozzles, pumps, cooling towers, monitoring and control stations, make up fluid tanks, or other devices that are used in power generation plants and equipment. Thermal communication refers to communication that involves the transfer of heat. Such communication generally involves radiation, conduction, convection or a combination thereof. Fluid communication refers to communication that involves the transfer of a fluid. In some embodiments, fluid communication may involve thermal communication (e.g., the transfer of a fluid from one point to another, where both points are not at the same temperature) or may not involve thermal communication (e.g., the transfer of a fluid from one point to another, where both points are at the same temperature). Thermal communication may involve fluid communication (e.g., convection or conduction) or may not involve fluid communication (e.g., radiation).

When a monitoring station is used, it is in electrical communication with the elements of the heat supply system 30, the closed loop 40 as well as any other loops or devices that may be used in the system 10. The monitoring station may employ a host of communication devices such as computers and other forms of electronic control to communicate with and control the elements of the heat supply system 30 and the closed loop 40.

When the first pipe 22 facilitates the supply of heat to the first heat exchanger 16 without the use of a closed loop 30, the first fluid generally comprises a hot exhaust. Examples of suitable hot exhaust streams are those emitted from an internal combustion engine such as a diesel or gasoline engine. In one embodiment, the first fluid can also be the exhaust emitted from the exhaust stream of a chemical reactor or processing equipment. Another example is the heat rejected from a nuclear reactor. Other suitable examples of a first fluid that may be transferred in the first pipe 22 to the first heat exchanger 16 are exhaust from sources such as, for example, braking system of automobiles or locomotives, gas or steam turbine exhaust, incinerators, cement kilns, oxidation processes for ammonia and others, furnaces such as, for example, copper reverberatory furnaces, forge and billet-heating furnaces, annealing furnaces, open-hearth steel furnaces, basic oxygen furnaces, sulfur ore processors, glass melting furnaces, zinc fuming furnaces, or the like, or a combination comprising at least one of the foregoing sources.

In another embodiment, the first fluid can be recycled between the heat source 24 and the first heat exchanger 16. In such cases, the first pipe 22 forms a closed loop 30 and is in thermal and/or fluid communication with the heat source 24.

When the heat source 24 comprises the earth, the first fluid, which can comprise water, is supplied through a deep well drilled to access a heat source of the earth's crust, often at a depth of about 1,500 to about 3,000 meters below the earth's surface. The area comprises porous rock, which is referred to as "dry rock," and does not interfere with water aquifers. This porous, and often fractured, rock, when combined with the water introduced via the well, forms a porous heat exchanger with the dispersed heat transfer area, sometimes covering several cubic kilometers. Another well is drilled in the fractured rock and behaves as a return well. The first fluid that is pumped down to the hot rock via the supply well is heated by contacting the hot rock, following which it is drawn through the return well to the ground level to be fed to the first heat exchanger 16. In another embodiment, steam from below the earth's surface may be directly used in the first heat exchanger 16 to heat the transfer fluid. This is referred to as "wet geothermal" and may not need pumping fluid into the ground.

When the heat source 24 is the sun, solar radiation can be collected via solar panels or other solar radiation collectors that are in thermal and/or fluid communication with the first heat exchanger 16. The term thermal and/or fluid communication as described herein indicates that the communication can be thermal communication, fluid communication or a combination of thermal and fluid communication. Thermal communication permits the direct heating of the transfer fluid in the first heat exchanger 16 and can optionally obviate the use of the first fluid. In another embodiment relating to the use of the sun as a heat source 24, solar energy is permitted to impinge on hollow panels that contain the first fluid. The first fluid is heated in the panels and this heat is subsequently transferred to the first heat exchanger 16 when the heated first fluid flows to first heat exchanger 16.

As stated above, the heat supply system 30, in some embodiments, comprises a first pipe 22 in thermal and/or fluid communication with the first heat exchanger 16 and the heat source 24. The first fluid flows from the heat source 24 to the first heat exchanger 16 through the pipe 22. In certain embodiments, the first fluid is heated by the heat source 24 to a temperature of greater than or equal to about 100° C. In another embodiment, the first fluid is heated to a temperature of greater than or equal to about 500° C. The first fluid transfers its heat to the transfer fluid in the first heat exchanger 16. In some embodiments, after transferring its heat to the transfer fluid in the first heat exchanger 16, the first fluid is pumped back to the heat source 24 in the first pipe 22. Alternatively, as noted above, the first fluid is alternatively exhausted into a waste stream or to the environment.

The first fluid that flows through the pipes 22 can be any fluid or fluidized media that is capable of absorbing heat rapidly from the heat source 24. The first fluid may comprise a fluidized solid, a liquid or a gas. As noted above, the first fluid can be the gaseous exhaust from an internal combustion engine, a chemical reactor, a nuclear reactor, or the like. When the heat supply system 30 is in the form of a closed loop, the first fluid is generally a liquid that can be recycled. The liquid can comprise monomers, oligomers or polymers. Examples of suitable liquids that can be used as the first fluid are water and other aprotic polar solvents; alcohols, ketones, and other polar protic solvents; benzene, toluene, and other non-polar solvents, and combinations comprising at least one of any of these liquids.

The first fluid may also comprise oligomeric fluids. Suitable examples of such fluids are polyethylene glycol, polypropylene glycol, polytetramethylene ether, or the like, or a combination comprising at least one of the foregoing fluids. Ionic liquids, which mainly comprise the imidazolium salts, may also be utilized for as the first fluid. The first fluid may also comprise electrolytes. Electrolytes consist of a liquid and a salt. The first fluid may also comprise additives such as anti-corrosive additives, self-sealing agents to fix ruptures in the first pipe 22, viscosity modifying agents, thermal stabilizers, or the like, or a combination comprising at least one of the foregoing additives. An exemplary first fluid is water.

The first heat exchanger 16 is used for facilitating a heat transfer between the first fluid and the transfer fluid. Examples of suitable heat exchangers are shell and tube heat exchangers, plate type heat exchangers such as spiral plate exchangers, plate and frame exchangers, brazed plate fin heat exchanger, plate, fin and tube surface heat exchanger, bayonet tube exchangers, spiral tube exchangers, rotating shell heat exchangers, or the like. In one embodiment, the heat exchanger has a heat transfer efficiency of greater than or equal to about 70%. In another embodiment, the heat exchanger has a heat transfer efficiency of greater than or equal to about 80%.

As noted above, the second pipe 26 facilitates the movement of the transfer fluid between the first heat exchanger 16, the first energy conversion device 12, and, in embodiments employing an absorber, the first absorber 8. The transfer fluid generally comprises an associating composition and a working fluid. The working fluid is capable of a thermally reversible association and dissociation with the associating composition. The association between the working fluid and the associating composition can include absorption, adsorption, chemisorption, physisorption, formation of ionic bonds, covalent bonds, ligands, or the like, or a combination comprising at least one of the foregoing. The association is exothermic and the heat generated during the association can be removed from the transfer fluid. The dissociation can include desorption, the breaking of bonds formed during chemisorption such as the breaking of ionic bonds, covalent bonds, ligands, hydrogen bonds, overcoming of Van der Waals forces, or the like, or a combination comprising at least one of the foregoing. The dissociation is endothermic and can be facilitated by supplying heat to the transfer fluid to heat it above the dissociation temperature.

The associating composition can comprise salts and/or particulate solids and/or ionic liquids. The salt has a cation that can comprise alkaline earth metals, alkali metals, transition group metals, rare earth metals, or a combination comprising at least one of the foregoing cations. Examples of suitable cations are lithium, sodium, potassium, cesium, berrylium, rubidium, magnesium, calcium, strontium, barium, yttrium, lanthanum, vanadium, niobium, tantalum, chromium, molybdenum, tungsten, cobalt, nickel, iron, copper, aluminum, tin, palladium, gold, silver, or the like, or a combination comprising at least one of the foregoing cations. Examples of suitable anions are halides such as fluorides, chlorides, bromides, or iodides; nitrates, nitrites, sulfates, sulfites, selenides, tellurides, perchlorates, chlorates, chlorites, hypochlorites, carbonates, phosphates, borates, silicates, permanganates, chromates, dichromate, or the like, or a combination comprising at least one of the foregoing anions.

Examples of suitable salts are strontium bromide, strontium chloride, calcium chloride, magnesium chloride, sodium chloride, potassium chloride, ammonium chloride, berrylium chloride, magnesium bromide, magnesium hypochlorite; calcium bromide, sodium bromide, calcium hypochlorite, barium bromide, barium chloride, manganese chloride, manganese bromide, ferric chloride, ferric bromide, cobalt chloride, cobalt bromide, nickel chloride, nickel bromide, nickel hypochlorite, chromium chloride, cadmium bromide, tantalum chloride, rhenium chloride, rhenium bromide, tin chloride, sodium tetrachloroaluminate, ammonium tetrachloroaluminate, potassium tetrachloroaluminate, ammonium tetrachlorozincate, $(NH_4)_3ZnCl_5$, potassium tetrachlorozincate, $CsCuCl_3$, $K_2FeCl_5$, or the like, or a combination comprising at least one of the foregoing salts. Exemplary salts are strontium bromide ($SrBr_2$), strontium chloride ($SrCl_2$), calcium chloride ($CaCl_2$), and magnesium chloride ($MgCl_2$).

In one embodiment, the associating composition can comprise an ionic fluid. The ionic fluids are generally room temperature ionic liquids (RTILs) and are composed of a cation and an anion, whose forces of attraction are not sufficiently strong to hold them together as a solid at ambient temperature. These salts are therefore liquids. RTILs are organic fluids that contain nitrogen-based organic cations and inorganic anions. RTILs generally comprise imidazolium or pyridinium cations having alkyl groups in the $C_2$ to $C_8$ range. Anions are generally small inorganic species such as $[BF_4]^-$, $[PF_6]^-$, triflate $[TfO]—CF_3SO_2^-$, nonaflate $[NfO]—CF_3(CF_2)_3SO_2^-$, bistrifluoromethane sulfonimide $[Tf2N]—(CF_3SO_2)_2N^-$, trifluoroacetate $[TA]—CF_3CO_2^-$, heptafluorobutanoate $[HB]—CF_3(CF_2)_3CO_2^-$ or $[NO_3]^-$. This property allows them to dissolve organic compounds and serve as potential solvents for industrially important organic reactions. Ionic liquids are environmentally friendly because they have no detectable vapor pressure and they are also non-flammable. Examples of suitable RTILs that can associate with the working fluid are trimethylphenylammonium bistrifluoride, 1,3-butylmethylpyrrolidinium bistriflamide, 1,3-butylmethylimidazolium bistriflamide, 1,3-ethylmethylimidazolium bistriflamide, 1,3-ethylmethylpyrrolidinium bistriflamide, 1,3-trihexyltetradecanephosphonium bistriflate, butylmethylimidazolium hexafluorophosphate, butylmethylimidazolium tetrafluoroborate, ethylmethylimidazolium bis(trifluoromethanesulfonyl)amide, ethylmethylimidazolium trifluoromethanesulfone, and ethylmethylimidazolium dicyanamide, 1-butyl-3-methylimidazolium chloride, 1-butylpyridinum chloride, or the like, or a combination comprising at least one of the foregoing RTILs.

In addition to the salts, the transfer fluid may also comprise other particulate solids such as, for example, zeolites (e.g., aluminum, sodium or calcium silicates), clay (e.g., aluminum silicate), or activated coal or carbon, or the like, or a combination comprising at least one of the foregoing particulate solids. Combinations of the salts with the particulate solids may also be used.

The associating composition is generally present in the transfer fluid in an amount of about 10 to about 90 wt %, based on the total weight of the transfer fluid. In one embodiment, the associating composition is generally present in the transfer fluid in an amount of about 20 to about 80 wt %, based on the total weight of the transfer fluid. In yet another embodiment, the associating composition is generally present in the transfer fluid in an amount of about 30 to about 70 wt %, based on the total weight of the transfer fluid. In an exemplary embodiment, the associating composition is generally present in the transfer fluid in an amount of about 50 wt %, based on the total weight of the transfer fluid.

The working fluid can be any fluid that can undergo a thermally reversible association and/or dissociation with the associating composition. The working fluid is capable of being dissociated from the associating composition at a temperature $T1$. In order for the transfer fluid to reach the temperature $T1$, heat may be supplied either through thermal and/or fluid communication with the first fluid in the first heat exchanger 16 or alternatively by direct heat obtained from solar radiation and the like. The dissociation of the working fluid from the associating composition is an endothermic process. Thus when the transfer fluid absorbs heat while in the first heat exchanger 16, the working fluid dissociates from the associating composition. The working fluid that dissociates from the associating composition is now at a higher pressure and temperature than the pressure and temperature in the transfer fluid. The working fluid is then permitted to expand and during this expansion contacts a movable surface of the first energy conversion device 12. The movable surface can either undergo reciprocatory motion, rotary motion, or a combination of reciprocatory and rotary motion. The expansion of the working fluid is thereby converted into another form of energy (e.g., thermal to mechanical). In one embodiment, the energy conversion device is a turbine and the expansion of the working fluid upon the turbine blade is converted into electrical energy. In another embodiment, the energy conversion device is a piston that is in reciprocatory slideable communication with a cylinder. The expansion of the working fluid promotes a reciprocatory motion of the piston within the cylinder. This reciprocatory motion can be converted into rotary motion, which is then converted into electrical energy via a generator.

In the process of expansion, the working fluid is cooled to a temperature $T2$, wherein $T2$ is less than $T1$. The working fluid after expansion is termed the spent working fluid. After expansion through the energy conversion device, the spent working fluid can be optionally further cooled to a temperature $T3$, wherein $T3$ is less than $T2$. The temperature $T3$ is a temperature at which association of the spent working fluid with the spent associating composition takes place. In one embodiment, the temperature $T3$ can be equal to $T2$, and there may be no need for additional cooling.

This association is accompanied by an exotherm. This association of the spent working fluid into the spent associating composition at a specific temperature (e.g., at the temperature $T3$) creates a low pressure. The heat generated by the association can be removed by a coolant. Both, the first absorber 8 and the first heat exchanger 16 can be provided with a cooling loop to remove the heat generated by the exotherm.

A suitable working fluid is a liquid or gas that has a dipole moment and is also capable of undergoing covalent bond-breaking reactions. Suitable working fluids are polar protic solvents and dipolar aprotic solvents. Examples of suitable working fluids are ammonia, alcohols (e.g., methanol, ethanol, butanol); water; carbon dioxide; hydrogen; amines (e.g., pyrrole, pyridine, methyl amine, dimethyl amine, trimethyl amine); ethers; glycols; glycol ethers; sebacates; phthalates (e.g., diethylhexylphthalate (DEHP), monoethylhexylphthalate (MEHP), dimethylphthalate(DMP), butylbenzylphthalate (BBP), dibutylphthalate (DBP), dioctylphthalate (DOP)); aldehydes (e.g., acetaldehydes, propionaldehydes), formamides (e.g., N,N-dimethylformamide); ketones (e.g., acetone, methyl ethyl ketone, β-bromoethyl isopropyl ketone); acetonitrile; sulfoxides (e.g., dimethylsulfoxide, diphenylsulfoxide, ethyl phenyl sulfoxide); sulfones (e.g., diethyl sulfone, phenyl 7-quinolylsulfone); thiophenes (e.g., thiophene 1-oxide); acetates (e.g., ethylene glycol diacetate, n-hexyl acetate, 2-ethylhexyl acetate); amides (e.g., propanamide, benzamide) or the like, or a combination comprising at least one of the foregoing fluids. An exemplary working fluid is ammonia.

When the associating composition is contacted with the working fluid, the resulting complex can be an ammoniated complex, a hydrated amine, an alcohol complex compound, metal hydrides, metal oxide-metal carbonate, metal oxide-metal hydroxide complexes, or the like, or a combination comprising at least one of the foregoing compounds. Examples of suitable complexes formed by contacting the associating composition with the working fluid are $BeCl_2.X(NH_3)$, wherein X is about 2 to about 4; $MgCl_2.X(NH_3)$ wherein X is about 2 to about 6; $MgBr_2.X(NH_3)$, wherein X is about 2 to about 6; $Mg(ClO_4)_2.X(NH_3)$, wherein X is about 0 to about -6; $CaCl_2.X(NH_3)$, wherein X is about 2 to about 4; $CaCl_2.X(NH_3)$, wherein X is about 4 to about 8; $CaBr_2.X(NH_3)$, wherein X is about 2 to about 6; $Ca(ClO_4)_2.X(NH_3)$, wherein X is about 2 to about 6; $SrCl_2.X(NH_3)$, wherein X is about 1 to about 8; $SrBr_2.X(NH_3)$, wherein X is about 2 to about 8; $Sr(ClO)_2.X(NH_3)$, wherein X is about 0 to about 6; $BaBr_2.X(NH_3)$, wherein X is about 4 to about 8; $BaCl_2.X(NH_3)$, wherein X is about 0 to about 8; $MnCl_2.X(NH_3)$, wherein X is about 2 to about 6; $MnBr.X(NH_3)$, wherein X is about 2 to about 6; $FeCl_2.X(NH_3)$, wherein X is about 3 to about 6; $FeBr_2.X(NH_3)$, wherein X is about 2 to about 6; $CoCl_2.X(NH_3)$, wherein X is about 2 to about 6; $CoBr_2.X(NH_3)$, wherein X is about 2 to about 6; $NiCl_2.X(NH_3)$, wherein X is about 2 to about 6; $NiBr_2.X(NH_3)$, wherein X is about 2 to about 6; $Ni(ClO_3)_2.X(NH_3)$, wherein X is about 0 to about 6; $CrCl_2.X(NH_3)$, wherein X is about 0 to about 3 and about 3 to about 6; $CdBr_2.X(NH_3)$, wherein X is about 2 to about 6; $TaCl_3.X(NH_3)$, wherein X is about 0 to about 7; $ReCl_3.X(NH_3)$, wherein X is about 0 to about 6; $ReBr_3.X(NH_3)$, wherein X is about 0 to about 7; $SnCl_2.X(NH_3)$, wherein X is about 0 to about 2.5; $NH_4AlCl_4.X(NH_3)$, wherein X is about 0 to about 6; $NaAlCl_4.X(NH_3)$, wherein X is about 0 to about 6; $KAlCl_4.X(NH_3)$, wherein X is about 0 to about 6; $(NH_4)_2ZnCl_4.(NH_3)$, wherein X is about 0 to about 4; $(NH_4)_3ZnCl_5.X(NH_3)$, wherein X is about 0 to about 6; $K_2ZnCl_4.X(NH_3)$, wherein X is about 0 to about 5; $K_2ZnCl_4.X(NH_3)$, wherein X is about 5 to about 12; $CsCuCl_3.X(MH_3)$, wherein X is about 2 to about 5; $K_2FeCl_5.X(NH_3)$, wherein X is about 2 to about 5; $NH_4Cl.X(NH_3)$, wherein X is about 0 to about 3; $NaBr.X(NH_3)$, wherein X is about 0 to about 5.25; $CaCl_2.XH_2O$, wherein X is about 1 to about 4; or the like, or a combination comprising at least one of the foregoing complexes. Exemplary complexes formed by contacting the associating composition with the working fluid are $SrBr_2.8NH_3$, $SrCl_2.8NH_3$, $CaCl_2.NH_3$, $MgCl_2.NH_3$ and $CaCl_2.H_2O$.

The working fluid is generally present in the transfer fluid in an amount of about 10 to about 90 wt %, based on the total weight of the transfer fluid. In one embodiment, the working fluid is generally present in the transfer fluid in an amount of about 20 to about 80 wt %, based on the total weight of the transfer fluid. In yet another embodiment, the working fluid is generally present in the transfer fluid in an amount of about 30 to about 70 wt %, based on the total weight of the transfer fluid.

The transfer fluid, in certain embodiments, further comprises a carrier fluid in addition to the working fluid and the associating composition. In one embodiment, the carrier fluid has some affinity for the working fluid. In one embodiment, the carrier fluid can dissolve the working fluid. In another embodiment, the carrier fluid can undergo a reaction with working fluid to form a complex. The carrier fluid can have a vapor pressure considerably lower than the partial pressure of the working fluid. The difference between the vapor pressure and the partial pressure should prevail throughout the entire operating range of the process. In one embodiment, there is at least a 25° C. difference between the boiling points of the carrier fluid and the working gas. In another embodiment, the carrier fluid is in the liquid state during the association and dissociation stages of the process.

A suitable carrier fluid has a greater affinity for the working fluid than it does for the associating composition. For example, suitable carrier fluids do not promote dissolution of the associating composition to any considerable extent or agglomeration of the associating composition so that mass diffusion might otherwise be hindered during association or dissociation. The carrier fluid should not occupy any sites on the associating composition that may be used by the working fluid to associate with the salts and/or the particulate solid. In addition, the carrier fluid should be able to maintain the associating composition in a suspension that can be pumped.

In one embodiment, the carrier fluid can evaporate at the same temperature as the working fluid. In such a case the carrier fluid can undergo expansion along with the working fluid when the vapors contact the moving surface of the energy generation device.

Examples of suitable carrier fluids are long chain alcohols having at least seven carbon atoms and the isomers thereof (e.g., octanol, heptanol); ethers, glycols (e.g., diethylene glycol), glycol ethers (e.g., diethylene glycol diethyl ether); sebacates (e.g., diethyl sebacate); phthalates (e.g., diethyl phthalate); aldehydes (e.g., succinaldehyde) and ketones, or the like, or a combination comprising at least one of the foregoing. An exemplary carrier fluid is heptanol.

The carrier fluid is generally present in the transfer fluid in an amount of about 1 to about 80 wt %, based on the total weight of the transfer fluid. In one embodiment, the carrier fluid is generally present in the transfer fluid in an amount of about 5 to about 70 wt %, based on the total weight of the transfer fluid. In yet another embodiment, the carrier fluid is generally present in the transfer fluid in an amount of about 10 to about 30 wt %, based on the total weight of the transfer fluid.

In certain embodiments, the formation of the transfer fluid is carried out by first forming a mixture of the carrier fluid and the associating composition and then introducing the working fluid into the mixture. Alternatively, the working fluid is first mixed with the associating composition prior to the addition of the carrier fluid. In one embodiment, the working fluid is first dissolved in the liquid carrier prior to associating with the associating composition. The mixing of the working fluid with the liquid carrier and the associating composition may be conducted in identical vessels or separate vessels if so desired.

In one embodiment, the transfer fluid comprises the working fluid and the associating composition and can be in the form of a slurry. In another embodiment, the transfer fluid comprises the working fluid, the associating composition and the carrier fluid and can be in the form of a slurry. In yet another embodiment, the transfer fluid comprises the working fluid, the associating composition and the carrier fluid and is not in the form of a slurry. The term slurry as referred to herein is a mixture of the associating composition with the carrier fluid, wherein association between the working fluid and the associating composition takes place. In a slurry at least a portion of the associating composition is insoluble in the carrier fluid.

In one embodiment, the heat of association/dissociation between the working fluid and the associating composition is greater than equal to about 500 kilojoules per kilogram (kJ/Kg). In yet another embodiment, the heat of association/dissociation between the working fluid and the associating composition can be greater than or equal to about 2500 kJ/Kg. In yet another embodiment, the heat of association/dissociation between the working fluid and the associating composition can be greater than or equal to about 3000 kJ/Kg. As a result of the large value of the heat of association/dissociation, large amount of heat must be input into the transfer fluid in order to separate the working fluid from the associating composition.

As stated above, when the working fluid is separated from the associating composition, it is at a high pressure and a high temperature T1. The working fluid is then expanded in an energy conversion device to produce electrical energy. In one embodiment, when the working fluid is dissociated from the associating composition it is generally at a temperature of about 120 to about 180° C. and a pressure of about 3,200 kPa (kilopascals) to about 17,800 kPa. In another embodiment, when the working fluid is dissociated from the associating composition it is at a temperature of about 130 to about 170° C. and a pressure of about 4,000 to about 16,000 kPa. In yet another embodiment, when the working fluid is dissociated from the associating composition it is at a temperature of about 140 to about 160° C. and a pressure of about 5,000 to about 15,000 kPa.

The energy conversion device 12 facilitates the conversion of the energy of expansion of the working fluid to electrical energy. The expansion of the working fluid may be used to produce reciprocatory or rotary motion in an energy conversion device. The reciprocatory motion can be converted to rotary motion and the rotary motion can be used to drive an electrical motor (i.e., generator/alternator) that can generate electricity. In one embodiment, the energy conversion device is a turbine. The blades of the turbine are contacted with the expanding working fluid. The rotary motion of the blades is used to drive a generator/alternator to generate electricity. In another embodiment, the expanding working fluid contacts a piston that is in slideable reciprocatory motion with a cylinder. The reciprocatory motion of the piston can be converted into rotary motion via a crankshaft. This rotary motion can then be used to drive an electrical generator to generate electricity.

After expansion into the energy conversion device, the spent working fluid is at a lower temperature T2 than the temperature T1 prior to expansion. After expansion into the energy conversion device, the spent working fluid is at a temperature of about 25 to about 45° C. and a pressure of about 60 to about 170 kPa. In another embodiment, after expansion into the energy conversion device, the spent working fluid is at a temperature of about 28 to about 42° C. and a pressure of about 70 to about 150 kPa. In yet another embodiment, after expansion into the energy conversion device, the spent working fluid is at a temperature of about 30 to about 40° C. and a pressure of about 80 to about 140 kPa.

In one exemplary embodiment, the spent working fluid exits the turbine at a temperature of about 25° C. to about 50° C. and at a pressure of about 50 to about 500 kPa. Such an embodiment can apply in one instance where, for example, the transfer fluid comprises $SrCl_2.8NH_3$, which is derived from a working fluid comprising ammonia and an associating composition comprising strontium chloride. It is envisioned that temperature and pressure ranges other than the aforementioned temperature and pressure ranges can apply when a transfer fluid comprises $SrCl_2.8NH_3$.

In one embodiment, the system efficiency as a percentage of Carnot efficiency of the system 10 is greater than or equal to about 15%. The Carnot efficiency is the highest possible efficiency that can be achieved by any cycle operating between the high and low temperature limits of interest. In another embodiment, the efficiency of the system 10 is greater than or equal to about 25%. In yet another embodiment, the efficiency of the system 10 is greater than or equal to about 30%. In yet another embodiment, the efficiency of the system 10 is greater than or equal to about 35%.

The spent working fluid, after expanding in the energy conversion device, is transferred to a heat exchanger, such as, for example, the first absorber 8 or the first heat exchanger 16, where the association of the working fluid with the associating composition occurs. As stated above, the spent working fluid exiting the turbine can be optionally cooled to the temperature at which it will undergo association with the associating composition. Since the association of the working fluid with the associating composition is exothermic and generates heat, the excess heat generated is removed. This can either be accomplished by a suitable heat transfer mechanism such as the use of fans, fins, baffles, or the like. In another embodiment, the excess heat generated is used as a supplemental form of energy, thereby improving the efficiency of the system 10. This embodiment is described further in detail below.

As noted above, the system 10 may be operated in batch mode or in a continuous mode. In a batch mode, the dissociation of ammonia occurs intermittently and hence electricity is generated intermittently. However, this mode of intermittent energy generation can be combined with other methods of energy generation such as, for example, nuclear, hydrothermal, or the like, to continuously generate electrical energy.

Figure 2:
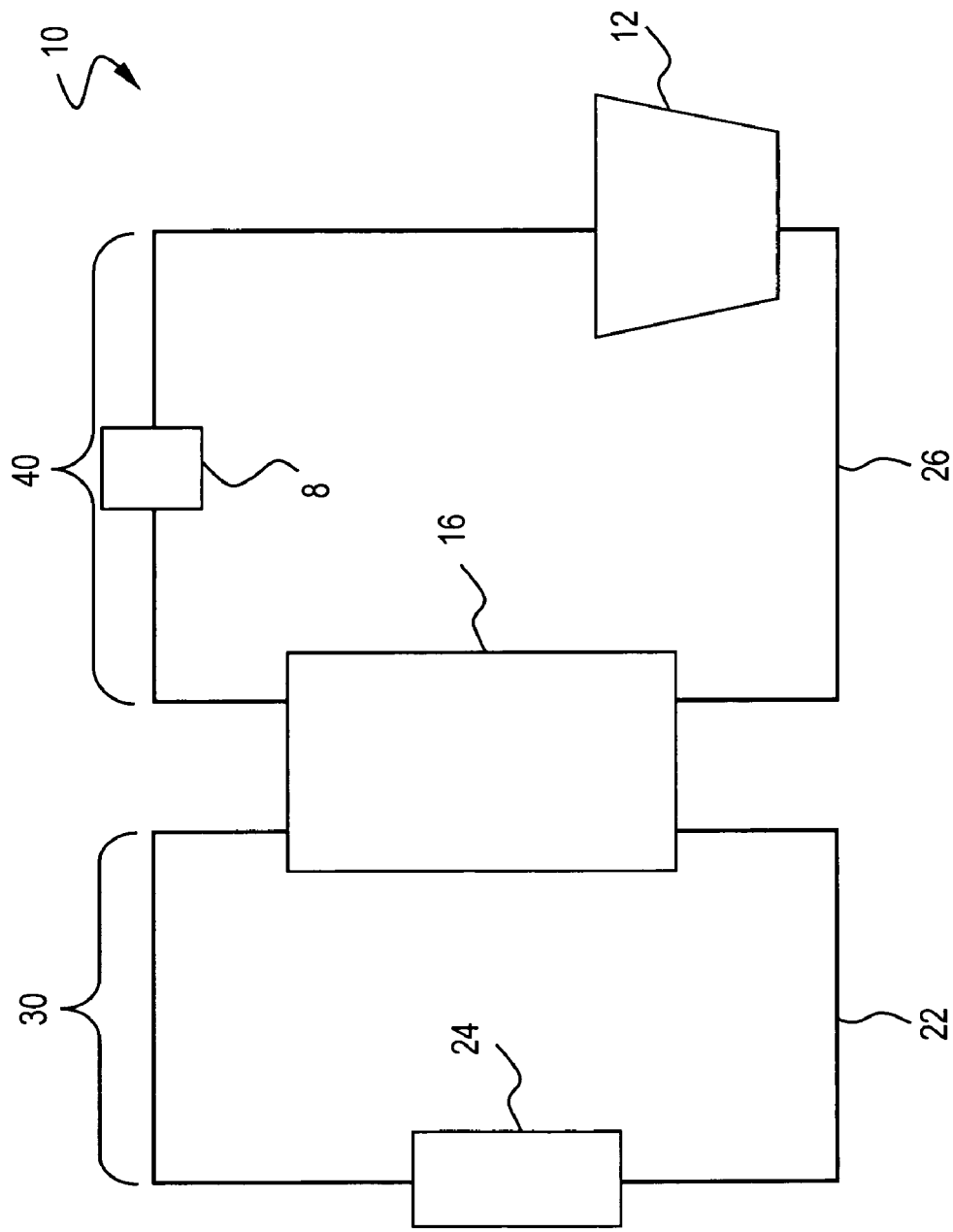
FIG. 2 is an exemplary depiction of one embodiment of a method for generating energy using a batch process.

In one method, in one exemplary manner of using the system 10 in either a batch mode or in a continuous mode as depicted in the FIG. 2, the system comprises a heat supply system 30 comprising a first pipe 22 in thermal and/or fluid communication with a first heat exchanger 16. The pipe is in physical contact with heat source 24. In one embodiment, the first pipe 22 forms a closed loop 30 and facilitates the movement of the first fluid. In another embodiment, the first pipe is open to the environment and exhausts the first fluid directly to the environment. In another embodiment, the first pipe 22 exhausts the first fluid to a treatment facility.

The closed loop 40 comprises the first heat exchanger 16, a first absorber 8 and the first energy conversion device 12. The first energy conversion device 12 comprises a turbine or a work extraction device. The closed loop 40 facilitates the movement of the transfer fluid. Upon being heated in the first heat exchanger 16 by thermal energy absorbed from the first fluid, the transfer fluid dissociates into the associating composition and the working fluid. The working fluid is in gaseous form. The working fluid then expands into the turbine, while the associating composition, stripped of the association with the working fluid, is left behind in the first heat exchanger 16. In one embodiment, after the working fluid is dissociated from the associating composition, the associating composition is pumped to a first absorber 8 where it is mixed with the spent working fluid. The spent working fluid is the working fluid that has undergone expansion in the energy conversion device. An optional accumulator (not shown) may be used to store the working fluid after dissociation. The working fluid is then expanded through the energy conversion device. The accumulator can be used to smooth the non-uniformity in the flow of the working gas to the energy conversion device. In particular embodiments, the expansion of the working fluid in the energy conversion device is used to generate electricity.

In one embodiment, the first absorber 8 is a heat exchanger adapted to receive the spent associating composition from the first heat exchanger 16 and the spent working fluid from the first energy conversion device 12. The spent associating composition and the spent working fluid associate in the absorber to produce the transfer fluid. This association is accompanied by an exotherm. The transfer fluid after the association can be transferred back to the first heat exchanger 16 to undergo dissociation, thus completing the cycle. It is to be noted that the first absorber 8 can be replaced by the first heat exchanger 16, if the first heat exchanger 16 is modified so that it can be used for both the association and dissociation. In this case, parts of heat exchanger 16 are acting as an absorber, where association of the working fluid with the associating composition takes place followed by an exotherm, whereas other parts of heat exchanger 16 act as desorber where heat is absorbed and dissociation of the working fluid takes place.

When the system is used in the batch mode, after the removal of the working fluid from the heat exchanger, the pumping of the first fluid through the heat supply system 30 is stopped by using a two-way valve (not shown). After the working fluid is expanded through the turbine, it is once again contacted with the associating composition in the first absorber 8 to form the transfer fluid. Association between the associating composition and the working fluid in the first absorber 8 is accompanied by an exotherm. The heat generated by the exotherm in the first absorber 8 may be removed by the use of a coolant. After the removal of heat from the transfer fluid it can be transferred to the first heat exchanger 16 from the first absorber 8 to undergo dissociation.

In one embodiment, the heat generated by this exotherm is extracted and used for the generation of additional energy. The removal of the generated heat promotes the cooling of the transfer fluid to a desired temperature. The removal of the generated heat can be accomplished by the use of a cooling fluid such as water. In some embodiments, the heat removed is sufficient to convert the water into steam, which can be used to drive a turbine or other energy conversion device, thereby generating energy. Upon the removal of the heat generated by the exotherm, the two-way valve in the heat supply system 30 may once again be opened. In another exemplary embodiment, the system 10 of FIG. 2 can be used to continuously generate energy in the turbine. The opening of the valve permits the association of the working fluid with the solid composition following which the cycle is continued. When the system 10 of FIG. 2 is used in the continuous mode, the first absorber 8 contains a quantity of the transfer fluid, which is transferred to the first heat exchanger 16 after the transfer fluid in the heat exchanger is dissociated. When the working fluid from the first heat exchanger 16 is dissociated from the associating composition, it is expanded through the energy conversion device 12. During the expansion of the working fluid through the energy conversion device 12, the associating composition is transferred to the first absorber 8. At the same time, the reserve quantity of the transfer fluid is transferred from the first absorber 8 to the first heat exchanger 16, where it begins the dissociation process. The spent associating composition that has been transferred to the first absorber 8, then undergoes association with the spent working fluid after it has been expanded to re-form the transfer fluid. The process is repeated, thereby continuously generating energy.

Figure 3:
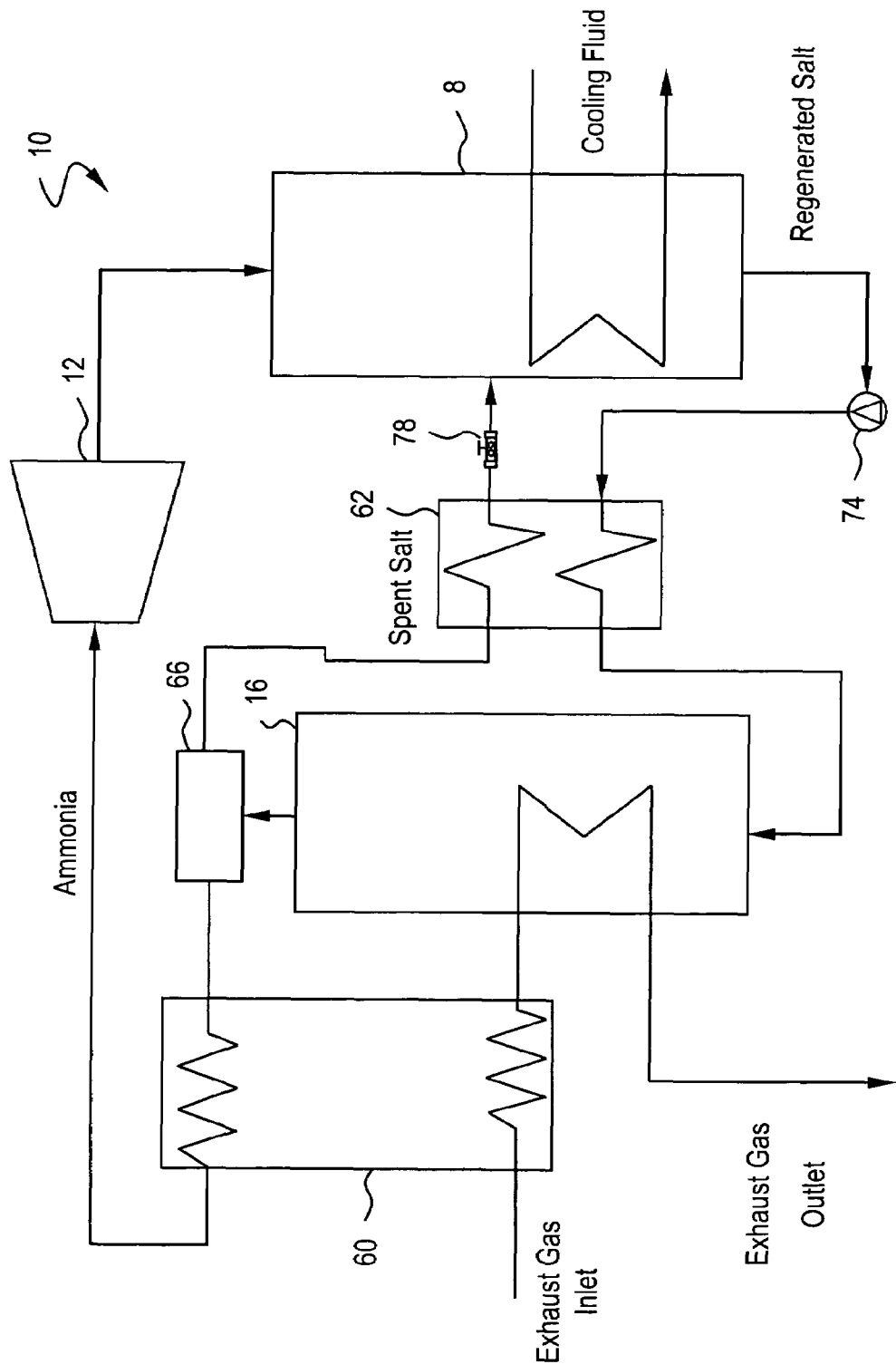
FIG. 3 is an exemplary depiction of one embodiment of a method for generating energy using a continuous process.

FIG. 3 shows another exemplary embodiment, of the system 10 that is continuously used to generate energy. In the FIG. 3, the system 10 comprises a first heat exchanger 16, a separator 66, a superheater 60, a first energy conversion device 12, a first absorber 8 and a regenerator 62. It is to be noted that the separator 66, the superheater 60 and the regenerator 62 are optional features. In the FIG. 3, the first energy conversion device 12 is located downstream of the first heat exchanger 16. The separator 66 and the superheater 60 are disposed between the first heat exchanger 16 and the first energy conversion device 12. The separator 66 and the superheater 60 are in thermal and/or fluid communication with the first heat exchanger 16 and the first energy conversion device 12. The first absorber 8 is downstream of the first energy conversion device 12. Disposed between the first absorber 8 and the first heat exchanger 16 is the regenerator 62. The regenerator is in fluid communication with the first heat exchanger 16 and the first absorber 8.

In this exemplary system, the first fluid comprising an exhaust gas at a temperature T1, is first passed through a superheater 60 and then through a first heat exchanger 16. In one particular embodiment, strontium chloride is used as the associating composition, while ammonia serves as the working fluid and heptanol is used as the carrier fluid. When the exhaust gas passes through the first heat exchanger 16, it dissociates the transfer fluid into a working fluid and an associating composition. The working fluid upon being dissociated is transferred to the superheater 60 where it picks up additional heat from the exhaust gas. The working fluid is then transferred to the first energy conversion device 12, where it expands and contacts the moving surfaces of the first energy conversion device 12 to produce energy. The spent associating composition is entrained in the carrier fluid, is transferred to a regenerator 62, and is then transferred to the first absorber 8, where it associates with the spent working fluid to re-form the transfer fluid. As noted above, this association is accompanied by an exotherm. A cooling fluid can be used to remove the heat generated as a result of the exotherm. The re-formed transfer fluid is then transferred to the first heat exchanger 16 via the regenerator 62. The regenerator 62 heats the transfer fluid after the transfer fluid exits the absorber. The regenerator 62 is located downstream of the first absorber 8 and upstream of the desorber 16. The regenerator uses the heat from the "spent" transfer fluid from the heat exchanger, 16, to preheat the "regenerated" transfer fluid from the absorber upstream of the heat exchanger. In this manner, the regenerator increases the efficiency of the cycle by internally exchanging heat from where heat needs to be rejected ("spent" transfer fluid from heat exchanger, 16) to where it needs be added ("regenerated" transfer fluid from absorber 8).

The system 10 of FIG. 3 can have pumps in fluid communication with the heat exchanger 16 and 60 and the absorber 8. It can also have a pressure regulators disposed between the heat exchanger and the absorber. The system can also have a separator that can be used to separate working fluid vapor from the associating composition after the dissociation has taken place in the first heat exchanger 16.

In another exemplary embodiment, in another manner of using the system 10 to continuously generate energy in the turbine, the heat supply system 30 and the closed loop 40 comprise at least two heat exchangers, a first heat exchanger 16 and a second heat exchanger 36. This mode of operation of the system 10 is depicted in the FIG. 4. The embodiment depicted in the FIG. 4 can also be used to generate energy in a batch mode if desired. Both heat exchangers are in thermal and/or fluid communication with the heat source 24 as well as the energy conversion device 12. In one embodiment, pertaining to the operation of the system 10, heated first fluid in the heat supply system 30 is alternated between the first and the second heat exchangers in a manner effective to promote the sequential dissociation of the working fluid in the first and the second heat exchangers. The sequential dissociation can be arranged so that the working fluid in the first heat exchanger 16 is completely dissociated from the associating composition prior to dissociating the working fluid in the second heat exchanger 36. Alternatively, the dissociation in the first heat exchanger 16 can be arranged to precede the dissociation in the second heat exchanger 36 by a certain selected time interval. If the dissociation in the first heat exchanger 16 can be arranged to precede the dissociation in the second heat exchanger 36 by a time interval that is greater than the time taken for the dissociation in the first heat exchanger 16, then the system 10 can be made to operate as a batch system.

When the first fluid is fed to the first heat exchanger 16, thereby establishing thermal and/or fluid communication between heat source 24 and first heat exchanger 16, dissociation of the working fluid from the associating composition takes place in the first heat exchanger. Similarly, when the first fluid is fed to the second heat exchanger 36, thereby establishing thermal and/or fluid communication between heat source 24 and second heat exchanger 36, dissociation of the working fluid from the associating composition takes place in the second heat exchanger 36. The working fluid that is dissociated in each case is fed to the first energy conversion device 12 to generate electricity. In certain embodiments, the working fluid that is dissociated is simultaneously fed to the first energy conversion device 12 to generate electricity.

Upon being expanded in the first energy conversion device 12, the spent working fluid from the first heat exchanger 16 is returned to the first absorber 8 while the working fluid from the second heat exchanger 36 is returned either to the first absorber 8 or to a separate absorber, not shown here. Alternatively, after expansion in the first energy conversion device 12, the spent working fluid from the first heat exchanger 16 is returned to the second heat exchanger 36, which will be acting as an absorber, and vice versa.

As detailed above, the associating composition left behind after the dissociation is pumped to a first absorber 8 where it can undergo association with the spent working fluid to re-form the transfer fluid. The removal of the heat cools the transfer fluid in the absorber. This transfer fluid is then transferred to the heat exchangers 16 and 36 where it is once again dissociated using heat from the heat source 24.

This method of operating the system 10 facilitates a continuous operation of the system and a continuous generation of energy. In one embodiment, the system 10 may comprise at least two heat exchangers as well as at least two energy conversion devices (not shown) that can be used to generate energy continuously.

Figure 4:
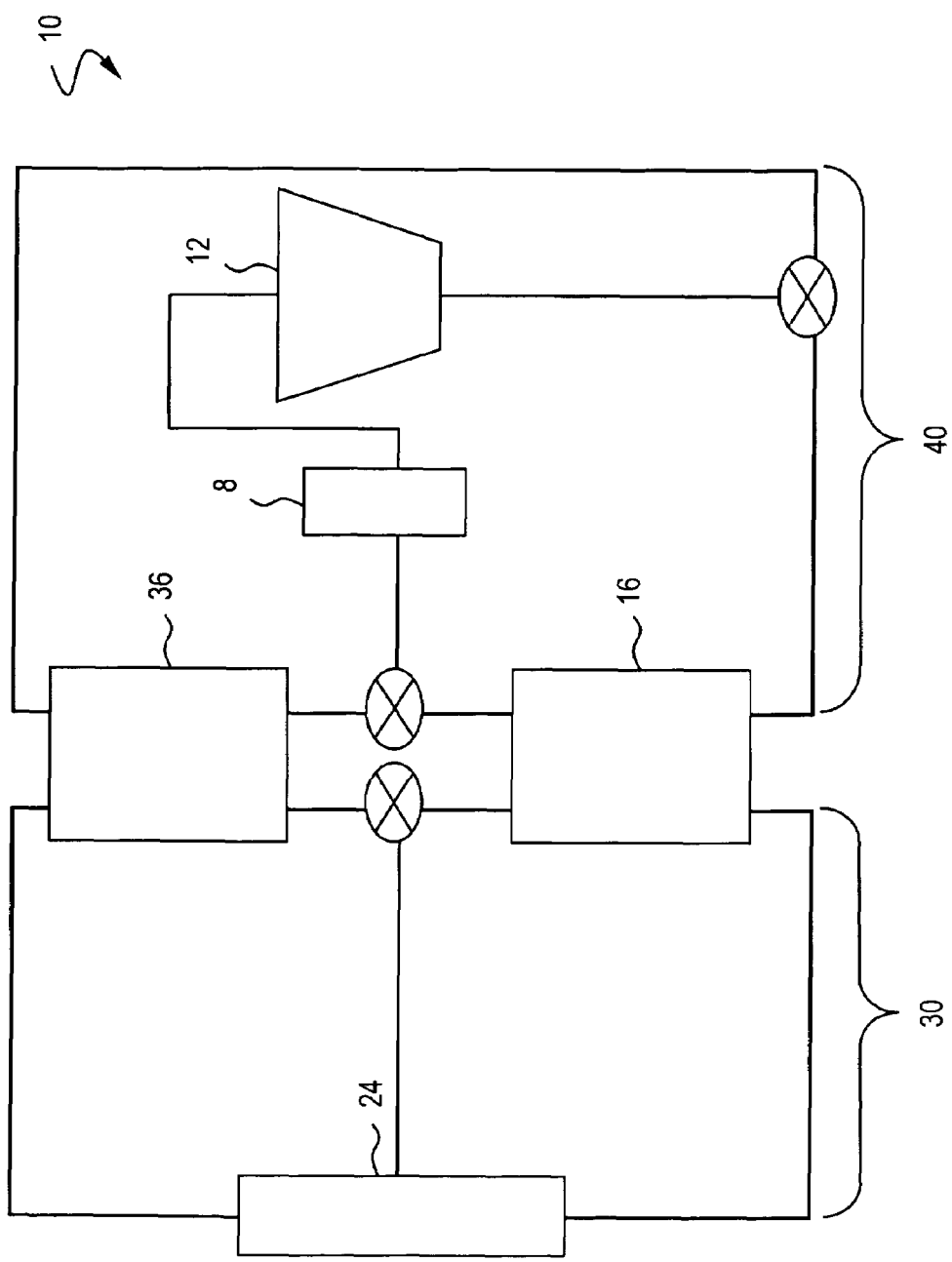
FIG. 4 is another exemplary depiction of one embodiment of a method for generating energy using a continuous process.
Figure 5:
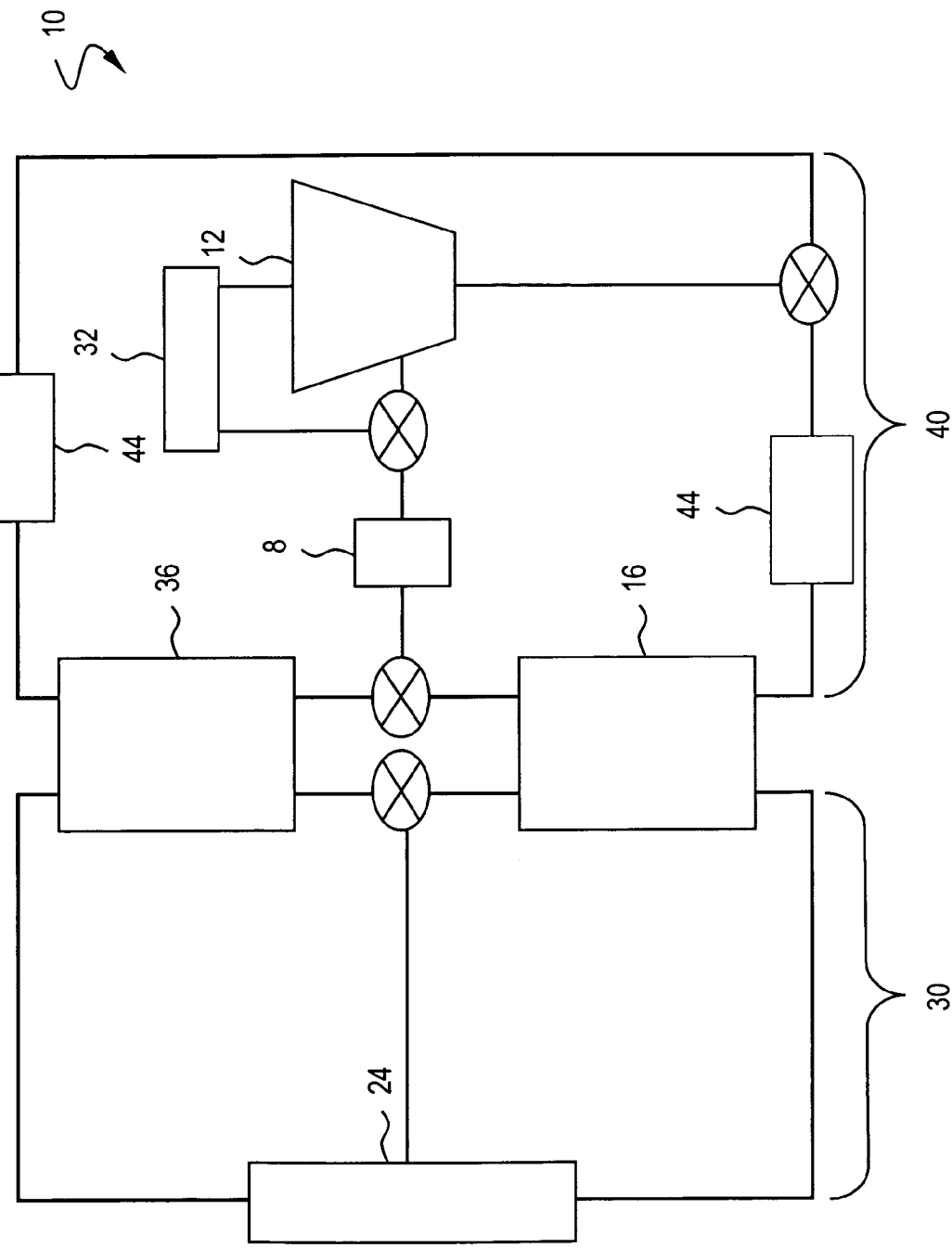
FIG. 5 is an exemplary depiction of one embodiment for using the system 10 as an energy storage device.

In yet another exemplary embodiment, the system 10 of FIG. 2 or FIG. 4 can be used as an energy storage device. In the use of the system as an energy storage device, the working fluid after expansion in the energy conversion device is condensed into a storage device 32, where it is stored in the form of a liquid. An exemplary depiction of the system 10 containing storage devices 32 or 44 is shown in the FIG. 5. The storage devices 32 and/or 44 may comprise condensers to condense the working fluid to a liquid. They can also be used to store the working fluid in vapor or liquid form.

When additional energy is desired during periods of low energy generation or during periods of peak energy demand, the working fluid from the storage device 44 can be pumped to the absorber 8 to associate with the associating composition. Since the association is exothermic, heat is liberated which can then be used for generating additional energy. As detailed above, the heat from the exotherm can be used to convert a cooling fluid such as water to steam, which can be used to drive a turbine or other form of energy conversion device.

The working fluid from the heat exchangers 16 and 36 can be stored in a storage device 44 either as a liquid or in vapor form. The liquid or vapor can then be expanded into the energy conversion device 12 as detailed above to generate electrical energy.

As noted above, the system 10 may utilize energy derived from the braking systems of vehicles, such as locomotives powered by diesel engines or other suitable engines.

Figure 6:
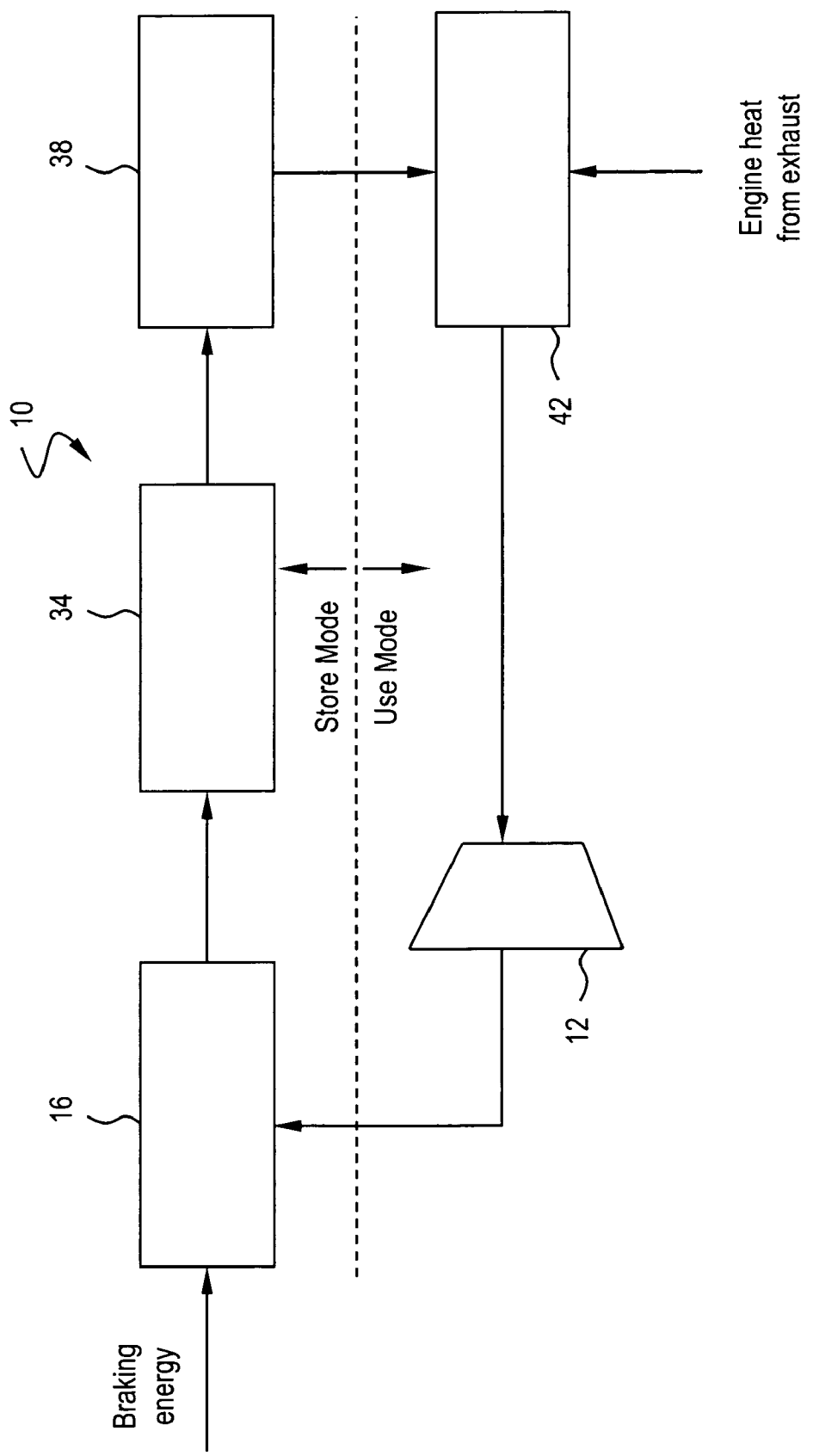
FIG. 6 is a schematic depiction of one exemplary embodiment of a system that can be utilized to convert energy from the braking systems of locomotives into electrical energy.

FIG. 6 is a schematic depiction of one exemplary embodiment of the system 10 that can be utilized to convert energy from the braking systems of locomotives into electrical energy. The locomotives may be, for example, steam locomotives, diesel locomotives or electrical locomotives. In exemplary embodiments of the type shown in FIG. 6, the system 10 is used for converting braking energy into electrical energy to drive the locomotive comprising a storage system (depicted as the store mode) and a user system (depicted as the use mode). The storage system comprises a first heat exchanger 16, a condenser 34 and a reservoir 38, while the user system comprises an evaporator 42 and an energy conversion device. In one embodiment, the energy conversion device is a turbine.

In the "store mode" heat derived from braking may be used to dissociate the working fluid from the associating composition. The working fluid is then condensed in the condenser 34 and stored in the reservoir 38 as a liquid. When energy has to be delivered to the engine for purposes of moving a load such as, for example, goods, passengers, or the like, the liquid from the reservoir is pumped to the evaporator 42, where energy from the exhaust system of the locomotive is used to heat the working fluid. The heated working fluid is now expanded through a turbine to generate electrical energy that can be used to drive the locomotive. The use of braking energy and exhaust energy for generating electricity reduces the fuel consumption of a diesel locomotive by an amount of greater than or equal to about 10%. In one embodiment, the fuel consumption of a diesel engine is reduced by an amount of greater than or equal to about 15%. In another embodiment, the fuel consumption is reduced by an amount of greater than or equal to about 20%. The system can also be used as an auxiliary power unit to keep the engine warm instead of idling the engine thereby saving more fuel. In this case, the liquid ammonia from 38 is bled into the first heat exchanger 16 (which already contains the associating composition). This association produces heat, which is carried away by another fluid such as, for example, engine cooling water to keep the engine and other components warm.

Figure 7:
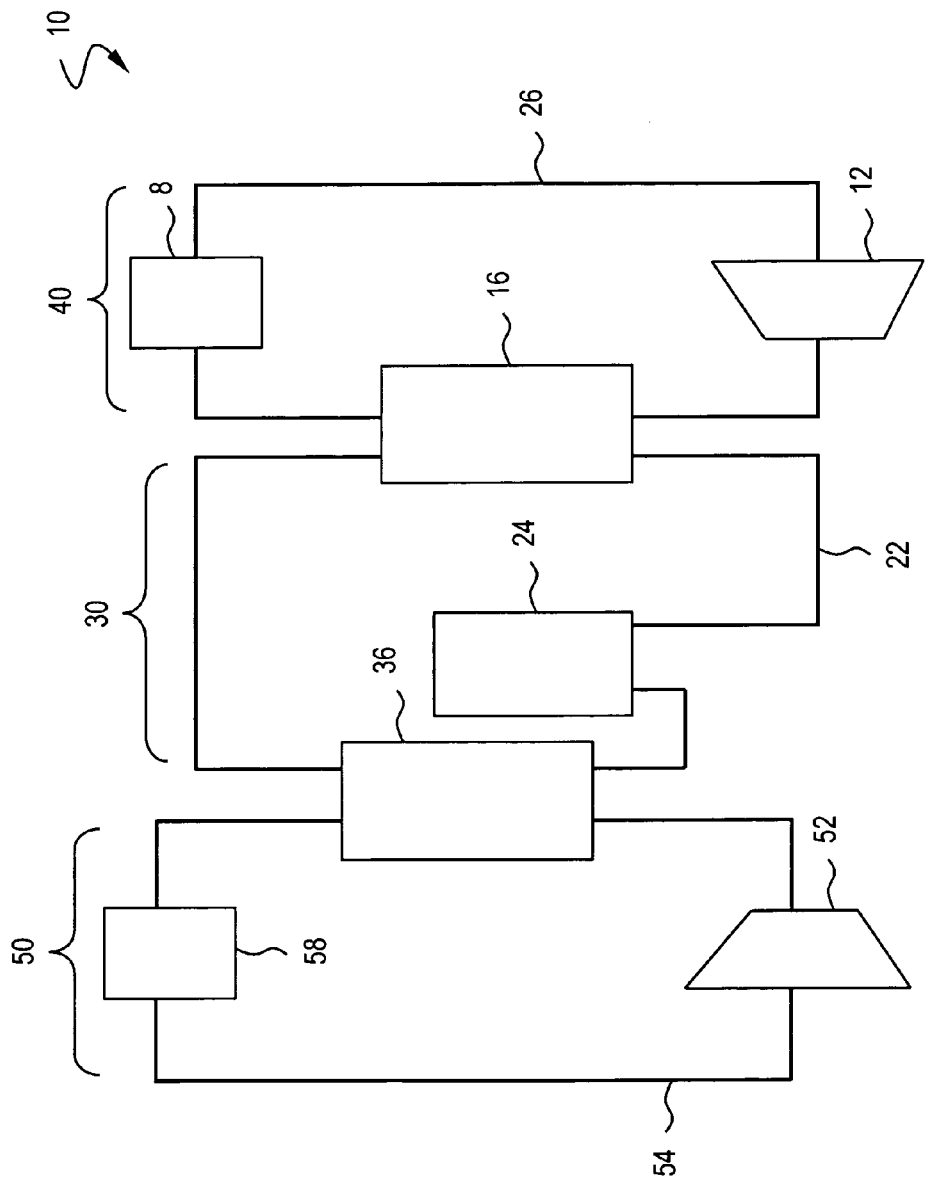
FIG. 7 is a schematic depiction of one exemplary embodiment of a multistage system 10 for generating energy.

In yet another embodiment, the system 10 is designed to work in stages. In this embodiment, an example of which is depicted in FIG. 7, the system 10 comprises multiple systems that are arranged in a manner so as to use the heat from the heat source 24 in series. As depicted in the FIG. 7, the system 10 comprises a heat supply system 30 that comprises a heat source 24, a first heat exchanger 16 and a second heat exchanger 36. As noted above, the heat supply system 30 can be a closed loop. Alternatively, the heat supply system 30 can use exhaust heat from a reactor or an internal combustion engine, in which case the exhaust is released directly to the atmosphere or to a treatment facility. The second heat exchanger 36 is down stream of the first heat exchanger 16 and in thermal and/or fluid communication with it, while both heat exchangers are down stream of the heat source 24 and in thermal and/or fluid communication with the heat source 24. A pipe 22 provides the thermal and/or fluid communication in the heat supply system 30 and facilitates the transfer of the first fluid. A first closed loop 40 comprises the first heat exchanger 16, the energy conversion device 12 and a first absorber 8. A pipe 26 provides the thermal and/or fluid communication between the first heat exchanger 16, the energy conversion device 12 and the first absorber 8. The first absorber 8 is downstream of the energy conversion device 12, while the energy conversion device 12 is downstream of the first heat exchanger 16. The heat supply system 30 and the first closed loop 40 are in thermal and/or fluid communication with each other via the first heat exchanger 16.

The system 10 also comprises a second closed loop 50 that comprises the second heat exchanger 36, a second energy conversion device 52 and an optional second absorber 58. The optional second absorber 58 may be replaced by the first absorber 8. The second energy conversion device 52 is downstream of the second heat exchanger 36, while the optional second absorber 58 is downstream of the second energy conversion device 52. A pipe 54 keeps the second heat exchanger 36, the second energy conversion device 52 and the optional second absorber 58 in thermal and/or fluid communication with one another. The heat supply system 30 and the second closed loop are in thermal and/or fluid communication with one another via the second heat exchanger 36. The second closed loop facilitates the movement of a second transfer fluid, which comprises an associating composition and a working fluid. In one embodiment, the second transfer fluid can be similar in composition to the transfer fluid. In another embodiment, the second transfer fluid is different in composition from the transfer fluid.

In the working of the multistage system 10 for power generation, a portion of the heat contained in the first fluid is utilized to dissociate the transfer fluid that flows in the closed loop 40. Following the dissociation, the remaining heat contained in the first fluid is used to dissociate a second transfer fluid that flows in the second closed loop 50. The dissociation of the second transfer fluid is used to generate additional electrical energy in the second energy conversion device 52.

In one embodiment, (not depicted) the first absorber 8 is the same as the second absorber 58. In such an event, the multistage system 10 thus can employ one association temperature and two dissociation temperatures. The first dissociation temperature in the first heat exchanger 16 is generally higher than the second dissociation temperature used in the second heat exchanger 36. The first heat exchanger 16 comprises one pressure stage, a high pressure stage. The high pressure stage operates between a pressure corresponding to the first dissociation temperature or the second dissociation temperature. The second heat exchanger 36 comprises one, low pressure stage. Spent working fluid from the second closed loop 50 is mixed with spent working fluid from the heat supply system 40 and is associated in the first absorber 8. Thus by selecting two different dissociation pressures, the system performance is improved.

Figure 8:
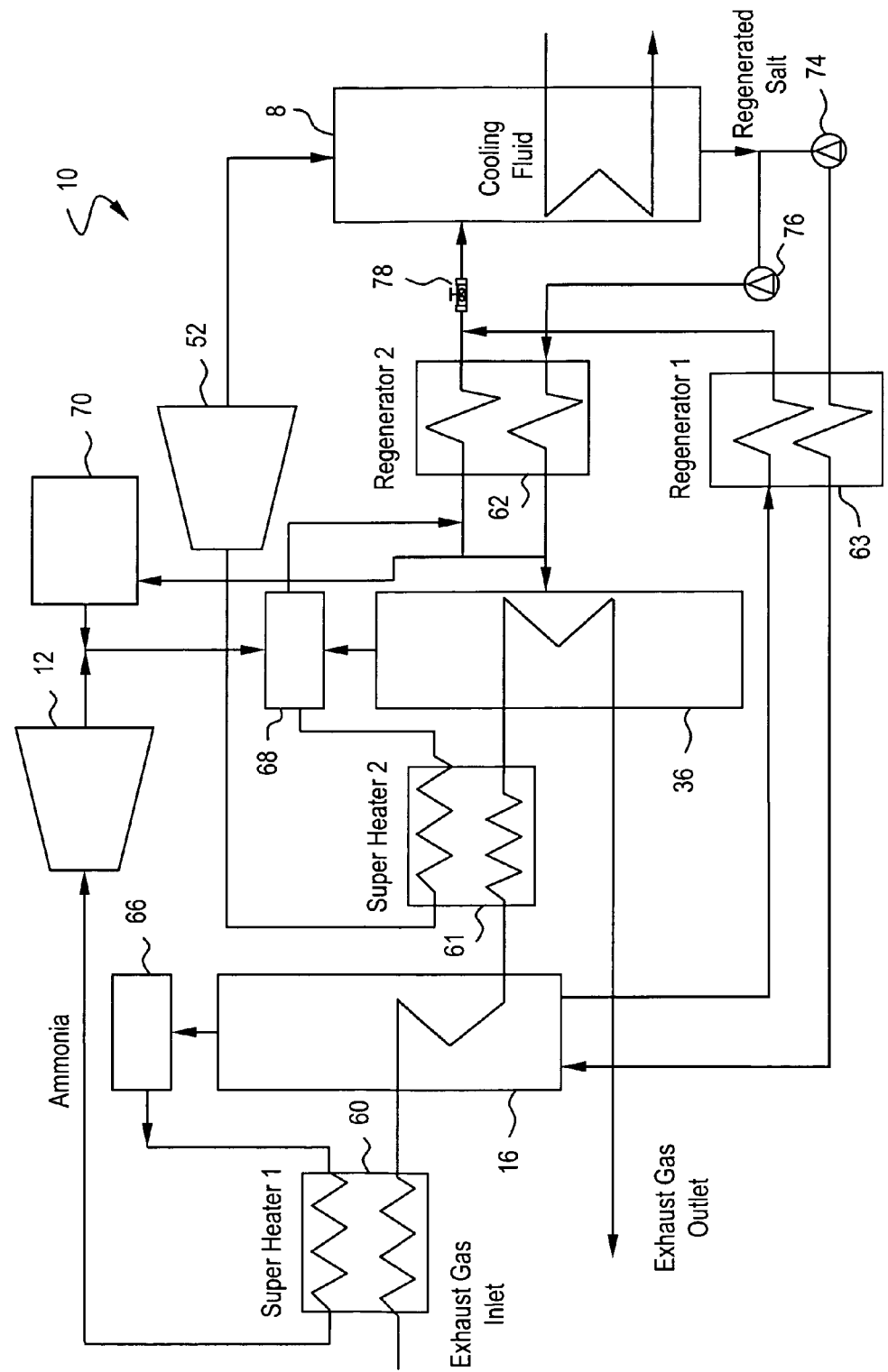
FIG. 8 is a schematic depiction of one exemplary embodiment of a multistage system 10 for generating energy.

In another exemplary embodiment, a system 10 can be used for generating energy in the manner depicted in the FIG. 8. The FIG. 8 depicts the system 10 as comprising a first heat exchanger 16, a second heat exchanger 36, a first superheater 60, a second superheater 61, a first separator 66, a second separator 68, an intercooler 70 which is a supplementary heat source, first regenerator 62, a second regenerator 63, a first absorber 8, a first energy conversion device 12 and a second energy conversion device 52. It is to be noted that optional features for the system in FIG. 8 are the first superheater 60, the second superheater 61, the first separator 66, the second separator 68, the intercooler 70, the first regenerator 62, and the second regenerator 63. The system can optionally also have valves and pumps that are used to control the flow of the various fluids or the associating composition in the system.

In this embodiment, a hot exhaust gas from a reactor such as, for example, an internal combustion engine is transferred through a first superheater 60, a first heat exchanger 16, a second superheater 61 and a second heat exchanger 36, prior to being exhausted to the atmosphere. The hot exhaust gas serves as the first fluid. In this system strontium chloride can be used as the associating composition, while ammonia serves as the working fluid. Heptanol can function as the carrier fluid. The heat from the exhaust gas dissociates the transfer fluid in the first heat exchanger 16 into a working fluid and an associating composition. The heat from the exhaust gas also dissociates another transfer fluid in the heat exchanger 36 into a working fluid and an associating composition. The working fluid from the first heat exchanger 16 is transferred to a first separator 66 where the working fluid is further separated from the associating composition and any additional matter that is contained in the working fluid. The first separator 66 is located downstream of the first heat exchanger 16 and upstream of the first superheater 60 and is thermal and/or fluid communication with the first heat exchanger 16 and the first superheater 60. The working fluid is then transferred to the first superheater 60 where it is further heated. The superheated working fluid from the first superheater 60 is then expanded through a first energy conversion device 12.

The working fluid upon contacting a moving surface of the first energy conversion device 12 produces motion in the first energy conversion device 12. This motion can be used to generate electrical energy. The spent working fluid upon exiting the first energy conversion device 12, is then transferred to a second separator 68, from which it is transferred to a second superheater 61. The second separator is located downstream of the first energy conversion device 12 and upstream of a second superheater 61. The second separator is also located down stream of the second heat exchanger 36 and the intercooler 70 and upstream of a second regenerator 63. The intercooler 70 functions as a supplementary heat exchanger and can use heat from alternate sources such as heat from a braking system, heat from the exhaust of a chemical reactor, heat from a nuclear reactor, furnaces, gas turbine exhaust, incinerators, annealing furnaces, cement kilns, oxidation processes for ammonia and others, copper reverberatory furnaces, forge and billet-heating furnaces, open-hearth steel furnaces, basic oxygen furnaces, sulfur ore processors, glass melting furnaces, zinc fuming furnaces, or the like. The second separator 68 is in thermal and/or fluid communication with the first energy conversion device 12, the second heat exchanger 36, the intercooler 70, and the second superheater 61. The second separator 68 receives spent working fluid from the first energy conversion device 12, the intercooler 70, the second heat exchanger 36 and separates this working fluid from salt and other unwanted dissolved matter. The separated working fluid is then transferred to the second superheater 61, where it is superheated and then expanded through the second energy conversion device 52. Electricity is generated upon expanding the working fluid through the second energy conversion device 52.

The working fluid is then transferred to the first absorber 8 where it is re-associates with the associating composition from the first heat exchanger 16 and the second heat exchanger 36. The first absorber 8 is located downstream of the second heat exchanger 36. The first absorber 8 receives spent working fluid from the second heat exchanger and receives the spent associating composition from the first and second regenerators. During the re-association of the spent working fluid with the spent associating composition from the first and second heat exchangers, heat is generated as a result of an exotherm that accompanies the association. A coolant can remove the heat generated in the first absorber 8. The regenerated transfer fluid from the first absorber 8 is then transferred to a first regenerator 62 and a second regenerator 63 from where it is transferred to the first heat exchanger 16 and the second heat exchanger 36 respectively thereby completing the cycle. In the aforementioned FIG. 8, pumps can be optionally used to pump the regenerated transfer fluid to the first and second regenerators respectively.

The number of stages in the system 10 of FIG. 8 can be expanded if desired. For example, and additional loop comprising a third heat exchanger, a third energy conversion device, with additional separators or additional absorbers can be added to the system to improve efficiency.

The systems and the methods described herein are advantageous in that they extract useful energy from waste heat. They can be advantageously used to improve the efficiency of primary energy systems (such as diesel engines) per unit of power produced or per unit of fuel burned. In addition, the energy generated by utilizing geothermal energy and/or solar energy to generate electricity minimizes environmentally unfriendly emissions into the atmosphere. Additionally, the method may be advantageously used to absorb heat from the braking systems and the exhaust systems of locomotives, thereby improving fuel efficiency in these locomotives. The system is advantageous in that the electrical energy may be used for the generation of hydrogen through electrolysis. The hydrogen can be further used to generate electricity in a fuel cell if desired. In another embodiment, the exit stream from this method can be used to desalinate salt-water into soft water.

The following examples, which are meant to be exemplary, not limiting, illustrate compositions and methods for generating energy using the systems described herein.

EXAMPLES

These examples were conducted to demonstrate the generation of electrical energy by using an associating composition that comprised strontium chloride ($SrCl_2$) salt. The working fluid was ammonia, while the carrier fluid was heptanol. In order to make the transfer fluid, industrial grade strontium chloride having a purity of greater than or equal to about 95% was first crushed to form a powder. The powder was dried at 150° C. for 24 hours. The dried strontium chloride was then milled/ground to powder. An exemplary grinder is a rotary retch mill. The powdered salt was then sieved to attain a powder having an average particle size of 38 micrometers or less. The salt was again dried for approximately 24 hours and the weight measured. The drying and weighing steps are repeated until no further moisture is driven off. When the weight loss stabilizes, the salt is cooled to room temperature.

The heptanol is purchased at a purity of greater than or equal to about 98%, based on the total weight of the heptanol. Upon determining the moisture content by Karl Fischer titration, an appropriate amount of 3A mole sieves are added to remove the moisture from the heptanol. A final Karl Fischer titration was conducted to determine that the moisture content in the heptanol was suitably close to zero.

The purified powdered salt was then mixed with heptanol to form a slurry at room temperture. The slurry was then stored in a container that is moisture proof.

Example 1

In this example, the slurry was then used to generate energy in a single stage system that employs a single desorber with a single pressure. The single stage system is depicted in the FIG. 3. The slurry saturated with ammonia is heated in the heat exchanger. The outlet stream from the heat exchanger comprises gaseous ammonia as well as slurry. These can be further separated in the separator. The ammonia gas goes to the superheater where it can be heated further before being expanded in a turbine. The low energy ammonia vapor from the turbine goes to the absorber, where it is mixed with spent salt coming from the separator. The saturated slurry from the absorber is sent back to heat exchanger, thereby completing the cycle. The superheaters which are gas-to-gas heat exchangers generally have nominal efficiencies of about 75%, while other heat exchangers (desorber, absorber and regenerator) have nominal efficiencies of about 85%. The energy conversion device has an efficiency of about 80%. Power generated in the turbine is 441 kilowatt.

Example 2

FIG. 8 shows a two stage thermochemical energy recovery system. In the two-stage system the exhaust gas leaving the single stage system still has significant energy (at 180° C.). Therefore a second desorber and superheater were added which makes it a two-stage system. Additional heat is also input from a separate heat source i.e., the intercooler. Even though the system has two desorbers and two superheaters, the system has only a single absorber. The power generated in the first stage turbine is 303 kilowatts, while the power generated in the second stage is 241 kilowatts. The heat generated at the absorber is 2032 kilowatts.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for generating energy, comprising:
   a first heat exchanger in thermal communication, fluid communication, or a combination of thermal and fluid communication with a first heat source, wherein the first heat exchanger heats a transfer fluid that comprises a working fluid and an associating composition, wherein the working fluid and the associating composition are capable of reversible associating with each other and wherein heating of the transfer fluid in the first heat exchanger generates a vapor comprising the working fluid;
   a first separator in thermal communication, fluid communication, or a combination of thermal and fluid communication with the first heat exchanger and downstream of the first heat exchanger;
   a first superheater in thermal communication, fluid communication, or a combination of thermal and fluid communication with the first separator and downstream of the first heat exchanger;
   a first energy conversion device in thermal communication, fluid communication, or a combination of thermal and fluid communication with the first superheater and downstream of first superheater, wherein the first energy conversion device comprises a moving surface that is contacted by the vapor generated in the first heat exchanger;
   an absorber downstream of the first energy conversion device and in thermal communication, fluid communication, or a combination of thermal and fluid communication with the energy conversion device, wherein the absorber is adapted to receive the vapor that has passed through the energy conversion device and to receive the associating composition that has passed through the heat exchanger;
   a first regenerator located upstream of the absorber and in thermal communication, fluid communication, or a combination of thermal and fluid communication with the absorber, wherein the regenerator is adapted to receive the transfer fluid from the absorber and allows the transfer fluid to return to the first heat exchanger; and
   a pump in thermal communication, fluid communication, or a combination of thermal and fluid conmunication with the first heat exchanger.

2. The system of claim 1, wherein the first heat source is a geothermal source of heat, a solar source of heat, an exhaust system of a locomotive, a braking system of a locomotive, an exhaust system of a chemical reactor, heat of a nuclear reactor, gas turbine exhaust, an incinerator, an annealing furnace, a cement kiln, an oxidation processes for ammonia, a copper reverberatory furnace, a forge furnace, a billet-heating furnace, an open-hearth steel furnace, an oxygen furnace, a sulfur ore processor, a glass melting furnace, a zinc fuming furnace, or a combination comprising at least one of the foregoing sources of heat.

3. The system of claim 2, wherein the geothermal source of heat is a heat source located at a depth of greater than or equal to about 1500 meters below the earth's surface and wherein the heat source can cover a volume of greater than or equal to about 1 cubic kilometer.

4. The system of claim 1, wherein the first heat source supplies heat to a first fluid that comprises a fluidized solid, a liquid or a gas.

5. The system of claim 1, wherein the first heat source supplies heat to a first fluid that comprises an aprotic polar solvent, a polar protic solvent, a non-polar solvents or a combination comprising at least one of the foregoing fluids.

6. The system of claim 5, wherein the first fluid is water.

7. The system of claim 1, wherein the transfer fluid comprises a complex derived from the absorption, adsorption, chemisorption, ionic bonding, covalent bonding, or the formation of ligands by the working fluid onto the associating composition.

8. The system of claim 7, wherein the associating composition comprises a salt and wherein the working fluid comprises a fluid that can undergo a thermally reversible association and/or dissociation with the salt.

9. The system of claim 7, wherein the associating composition comprises zeolites, clay, activated coal, room temperature ionic liquids or carbon.

10. The system of claim 9, wherein the room temperature ionic liquids are trimethylphenylammonium bistrifluoride, 1,3-butylmethylpyrrolidinium bistriflamide, 1,3-butylmethylimidazolium bistriflamide, 1,3-ethylmethylimidazolium bistriflamide, 1,3-ethylmethylpyrrolidinium bistriflamide, 1,3-trihexyltetradecanephosphonium bistriflate, butylmethylimidazolium hexafluorophosphate, butylmethylimidazolium tetrafluoroborate, ethylmethylimidazolium bis(trifluoromethanesulfonyl)amide, ethylmethylimidazolium trifluoromethanesulfone, and ethylmethylimidazolium dicyanamide, 1-butyl-3-methylimidazolium chloride, 1-butylpyridinum chloride, or a combination comprising at least one of the foregoing room temperature ionic liquids.

11. The system of claim 8, wherein the salt is strontium bromide, strontium chloride, calcium chloride, magnesium chloride, sodium chloride, potassium chloride, ammonium chloride, berrylium chloride, magnesium bromide, magnesium hypochlorite; calcium bromide, sodium bromide, calcium hypochlorite, barium bromide, barium chloride, manganese chloride, manganese bromide, ferric chloride, ferric bromide, cobalt chloride, cobalt bromide, nickel chloride, nickel bromide, nickel hypochlorite, chromium chloride, cadmium bromide, tantalum chloride, rhenium chloride, rhenium bromide, tin chloride, sodium tetrachloroaluminate, ammonium tetrachloroaluminate, potassium tetrachloroaluminate, ammonium tetrachlorozincate, (NH4)3ZnCl5, potassium tetrachlorozincate, CsCuCl3, K2FeCl5, or a combination comprising at least one of the foregoing salts.

12. The system of claim 8, wherein the working fluid is ammonia, an alcohol; water; carbon dioxide; hydrogen; an amine; a sebacate; a phthalate; an aldehydes; a formamide; a ketone; acetonitrile; a sulfoxide; a sulfone; an acetate; an amide; or a combination comprising at least one of the foregoing working fluids.

13. The system of claim 7, wherein the complexes are BeCl2.X(NH3), wherein X is between 2 and 4; MgCl2.X(NH3) wherein X is between 2 and 6; MgBr2.X(NH3), wherein X is between 2 and 6; Mg(ClO4)2.X(NH3), wherein X is between 0 and −6; CaCl2.X(NH3), wherein X is between 2 and 4; CaCl2.X(NH3), wherein X is between 4 and 8; CaBr2.X(NH3), wherein X is between 2 and 6; Ca(ClO4)2.X(NH3), wherein X is between 2 and 6; SrCl2.X(NH3), wherein X is between 1 and 8; SrBr2.X(NH3), wherein X is between 2 and 8; Sr(ClO)2.X(NH3), wherein X is between 0 and 6; BaBr2.X(NH3), wherein X is between 4 and 8; BaCl2.X(NH3), wherein X is between 0 and 8; MnCl2.X(NH3), wherein X is between 2 and 6; MnBr.X(NH3), wherein X is between 2 and 6; FeCl2.X(NH3), wherein X is between 3 and 6; FeBr2.X(NH3), wherein X is between 2 and 6; CoCl2.X (NH3), wherein X is between 2 and 6; CoBr2.X(NH3), wherein X is between 2 and 6; NiCl2.X(NH3), wherein X is between 2 and 6; NiBr2.X(NH3), wherein X is between 2 and 6; Ni(ClO3)2.X(NH3), wherein X is between 0 and 6; CrCl2.X(NH3), wherein X is between 0 and 3 and between 3 and 6; CdBr2.X(NH3), wherein X is between 2 and 6; TaCl3.X(NH3), wherein X is between 0 and 7; ReCl3.X(NH3), wherein X is between 0 and 6; ReBr3.X(NH3), wherein X is between 0 and 7; SnCl2.X(NH3), wherein X is between 0 and 2.5; NH4AlCl4.X(NH3), wherein X is between 0 and 6; NaAlCl4.X(NH3), wherein X is between 0 and 6; KAlCl4.X(NH3), wherein X is between 0 and 6; (NH4)2ZnCl4.(NH3), wherein X is between 0 and 4; (NH4)3ZnCl5.X(NH3), wherein X is between 0 and 6; K2ZnCl4.X(NH3), wherein X is between 0 and 5; K2ZnCl4.X(NH3), wherein X is between 5 and 12; CsCuCl3.X(MH3), wherein X is between 2 and 5; K2FeCl5.X(NH3), wherein X is between 2 and 5; NH4Cl.X(NH3), wherein X is between 0 and 3; NaBr.X(NH3), wherein X is between 0 and 5.25; CaCl2.XH2O, wherein X is between 1 and 4; or a combination comprising at least one of the foregoing complexes.

14. The system of claim 1, wherein the transfer fluid further comprises a carrier fluid.

15. The system of claim 14, wherein the carrier fluid is a long chain alcohols having at least seven carbon atoms and the isomers thereof; an ether, a glycol, a perfluorocarbon, a glycol ether; a sebacate; a phthalate; an aldehydes; a ketones; or a combination comprising at least one of the foregoing carrier fluids.

16. The system of claim 15, wherein the carrier fluid along with a vapor of the working fluid can be expanded in a energy conversion device to generate energy.

17. The system of claim 1, wherein the pump located upstream of and thermal communication, fluid communication, or a combination of thermal and fluid communication with the first heat exchanger; and wherein a pressure regulator is disposed between the heat first exchanger and the absorber, wherein the pressure regulator is located downstream of the first heat exchanger.

18. The system of claim 1, wherein the first regenerator heats the transfer fluid after the fluid exits the first absorber and prior to an entry of the transfer fluid into the first heat exchangers.

19. The system of claim 1, further comprising a second energy conversion and/or a third energy conversion device in thermal communication, fluid communication, or a combination of thermal and fluid communication with the first energy conversion device.

20. The system of claim 19, wherein the first heat exchanger, the second heat exchanger and/or the third heat exchanger are in thermal communication, fluid communication, or a combination of thermal and fluid communication with a first source of heat; and wherein a first absorber is in thermal communication, fluid communication, or a combination of thermal and fluid communication with the first heat exchanger, the second heat exchanger and/or the third heat exchanger; and wherein the absorber is also in thermal communication, fluid communication, or a combination of thermal and fluid communication with a first energy conversion device and a second energy conversion device.

21. The system of claim 20, further comprising an intercooler; wherein the intercooler is a supplementary heat exchanger adapted to heat a portion of the transfer fluid flowing from the first absorber.

22. The system of claim 21, wherein the intercooler is in thermal communication, fluid communication, or a combination of thermal and fluid communication with a supplementary heat source.

23. The system of claim 22, wherein the supplementary heat source uses heat derived from a braking system, exhaust of an internal combustion engine, exhaust from a chemical reactor, exhaust from a nuclear reactor, a geothermal source, gas turbine exhaust, incinerators, annealing furnaces, cement kilns, oxidation processes for ammonia, copper reverberatory furnaces, forge heating furnaces, billet-heating furnaces, open-hearth steel furnaces, oxygen furnaces, sulfur ore processors, glass melting furnaces, zinc fuming processors, furnaces, or a combination comprising at least one of the foregoing heat sources.

24. The system of claim 21, wherein the intercooler is the compressed air of a turbocharger.

25. The system of claim 1, further comprising a first energy storage unit configured to receive vapor from the first heat exchanger.

26. The system of claim 1, wherein the first heat source and the first heat exchanger are part of a closed loop.

27. The system of claim 1, wherein the first energy conversion device is in thermal communication, fluid communication, or a combination of thermal and fluid communication with an absorber, via a second separator, a second superheater and a second energy conversion device, wherein the second separator, the second superheater and the second energy conversion device are downstream of the first energy conversion device.

28. The system of claim 27, wherein the absorber is in thermal communication, fluid communication, or a combination of thermal and fluid communication with a first heat exchanger and/or a second heat exchanger via a regenerator, wherein the regenerator heats the transfer fluid after the transfer fluid exits the absorber.

29. The system of claim 27, wherein the absorber is in thermal conmunication, fluid conmunication, or a combination of thermal and fluid communication with a first heat exchanger via a first regenerator and wherein the absorber is in thermal conmunication, fluid conmunication, or a combination of thermal and fluid communication with a second heat exchanger via a second regenerator, wherein the first heat exchanger is down stream of the first regenerator and wherein the second heat exchanger is downstream of the second regenerator, wherein the regenerator heats the transfer fluid after the transfer fluid exits the absorber.

* * * * *